June 21, 1938. J. H. COHEN 2,121,317
FENDER GUIDE
Filed June 29, 1934 2 Sheets-Sheet 1
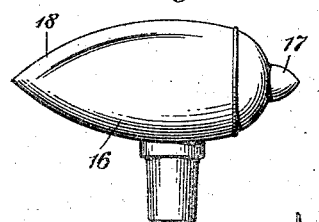
Fig. 1.
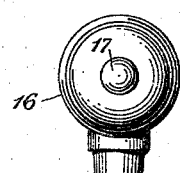
Fig. 2.
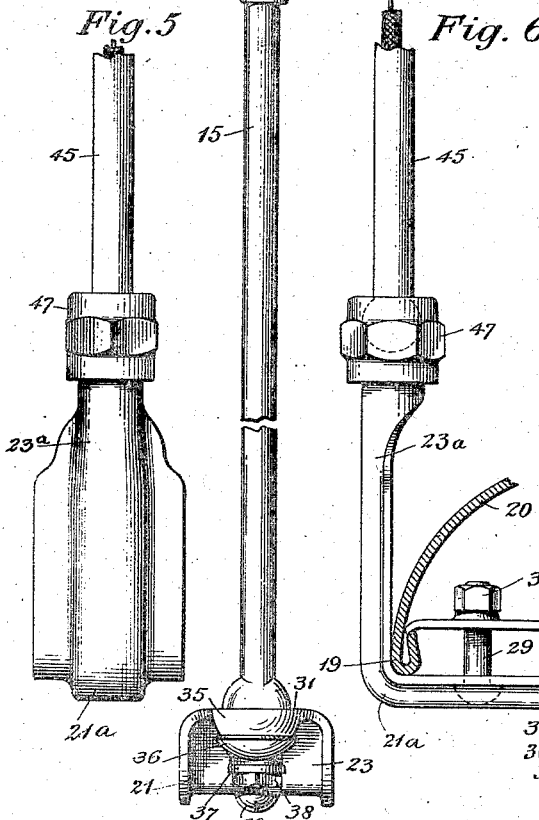
Fig. 5. Fig. 6.
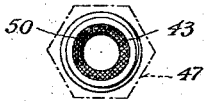
Fig. 7.
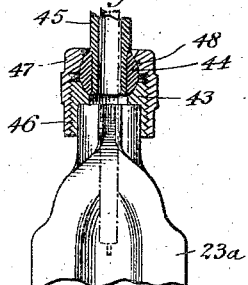
Fig. 8.
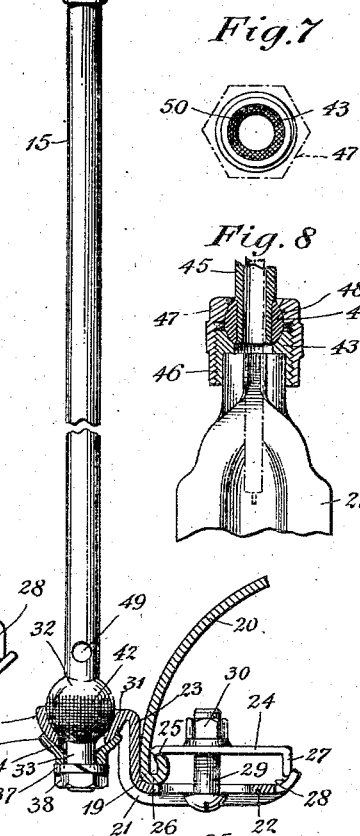
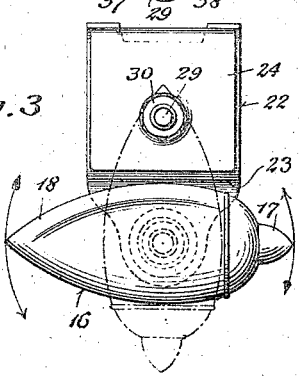
Fig. 3.
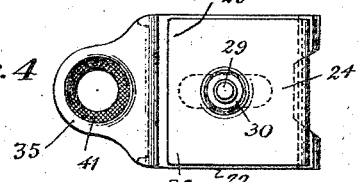
Fig. 4.
INVENTOR
Joseph H. Cohen
BY
ATTORNEY June 21, 1938.  J. H. COHEN  2,121,317
FENDER GUIDE
Filed June 29, 1934  2 Sheets-Sheet 2
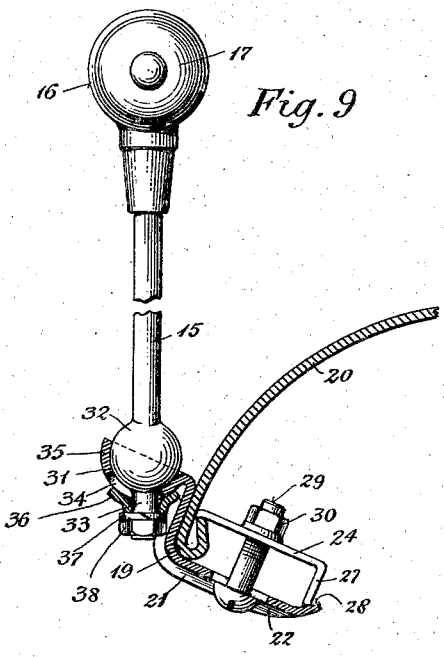
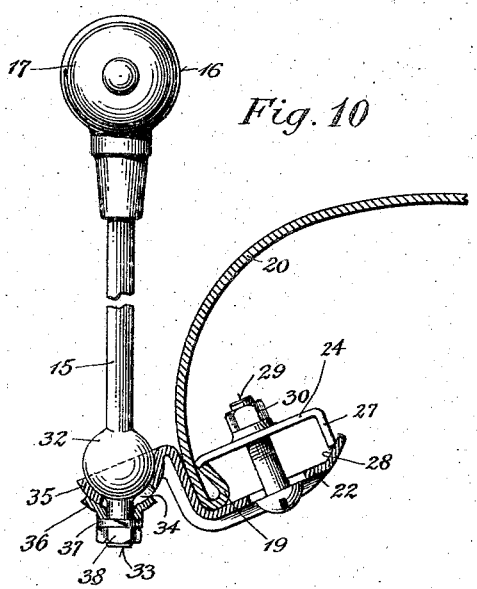
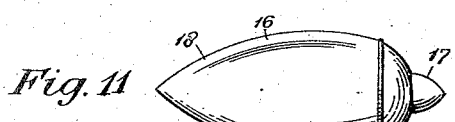
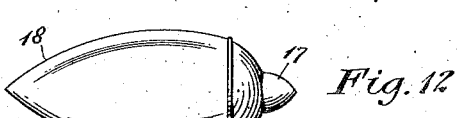
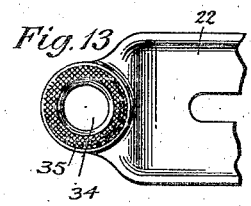
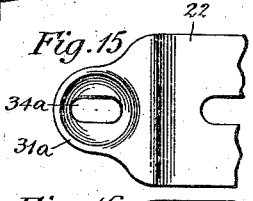
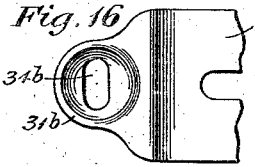
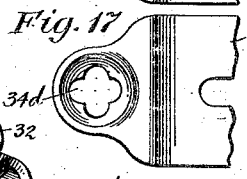
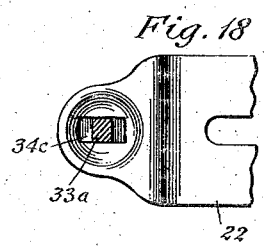
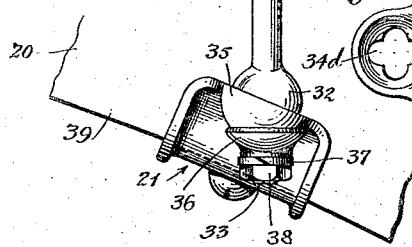
INVENTOR
ATTORNEY Patented June 21, 1938

2,121,317

UNITED STATES PATENT OFFICE 2,121,317

FENDER GUIDE

Joseph H. Cohen, Bridgeport, Conn., assignor to Casco Products Corporation, Bridgeport, Conn., a corporation of Connecticut Application June 29, 1934, Serial No. 733,063

3 Claims. (Cl. 248—43)

This invention relates to fender guides for motor vehicles and the like.

Fender guides, to be of practical value and utility, must essentially include a vertical rod and means for clamping the same to the edge of a mud guard or fender, and it is important that the rod extend substantially perpendicular to the ground and be located in line with, or slightly outside or beyond, the edge of the fender, so that the driver of the vehicle may determine the outer limits of the vehicle.

If the rod should be inclined inwardly, the value and use of the device is substantially destroyed, and a dangerous situation is presented, because the driver, relying on the fender guide to indicate the outer limits of the vehicle, would be misled and may not allow for sufficient clearance when passing other vehicles and objects, and thus collide therewith. On the other hand, if the fender guide projects outwardly, it may strike other objects which would otherwise be clear of the vehicle.

Should the fender guide incline in any direction, either outwardly or inwardly, or forwardly or backwardly, the driver is uncertain of the location of the fender and loses confidence in it, and hence the device falls into disuse.

The inclining of the rod or staff of the fender guide may result from careless and improper application of the clamping portion thereof to the fender, or it may result from the shape and contour of the fender at the portion thereof which the clamp engages, for the clamping means are usually constructed so as to cause the rod to be perpendicular to the clamp rather than to the ground.

An object of this invention is to provide a fender guide in which the rod may be caused to be perpendicular to the ground, regardless of the slanting in or out of the clamping bracket and regardless of whether or not the bracket tilts forwardly or backwardly.

This is accomplished, according to the present invention, by providing a universal joint or connection between the base of the rod or staff and the supporting bracket about which the rod may be adjusted to make it perpendicular to the ground after the clamping bracket is applied to the fender's edge.

To permit the fender guide, the sight or head of which has distinctly different front and back portions, to be properly used on either the right or left hand fender, it was proposed heretofore to have an adjustable connection between the rod and the sight.

The need for this is obviated by the present invention by making the universal connection between the rod and the bracket of a ball and socket, so that, while the rod is being swung to make it perpendicular, it may also be rotated to bring the front part of the sight forward.

According to the present invention, means are provided to lock the rod in adjusted perpendicular position, and preferably this same means may also be employed to hold the rod and sight against rotation.

Other features and advantages will hereinafter appear.

In the accompanying drawings, which illustrate several forms of my invention—

Figure 1 is a side elevation of a fender guide to which my invention has been applied.

Fig. 2 is a front view of the same, showing the bracket and a portion of the fender in section.

Fig. 3 is a top plan view of the device shown in Fig. 1.

Fig. 4 is a plan view of the bracket portion of the device shown in Figs. 1, 2 and 3.

Fig. 5 is a front view of the lower portion of the fender guide, showing a modified form of this invention.

Fig. 6 is a front view of the parts shown in Fig. 5, showing them applied to a fender.

Fig. 7 is a top plan view of the socket portion of the device show in Figs. 5 and 6.

Fig. 8 is a sectional view of the ball and socket connection shown in Figs. 5 and 6.

Fig. 9 is a front view, partly in section, of the device shown in Figs. 1 and 2, showing it attached to a fender, the lower edge of which is so shaped that the bracket inclines upwardly.

Fig. 10 is a similar view, showing the device attached to a fender which is of such shape as to cause the bracket to incline downwardly.

Fig. 11 is a side view of the device shown in Figs. 1 and 2, showing the bracket so attached to the fender as to incline downwardly and forwardly.

Fig. 12 is a similar view, showing the device so attached to the fender that the bracket inclines upwardly and forwardly.

Fig. 13 is a bottom plan view of the socket portion of the bracket, showing the latter knurled.

Fig. 14 is a top plan view of the knurled washer cooperating with the knurled surface shown in Fig. 13.

Fig. 15 is a view showing a modified form of connection between the ball and socket, whereby adjustments of the guide rod are limited to in and out movements.

Fig. 16 is a similar view, showing an arrangement whereby the adjustments are limited to forward and backward movements of the guide rod.

Fig. 17 is a similar view, showing an arrangement whereby the guide rod may be moved only forwardly and backwardly, or inwardly and outwardly, and in any of these positions may be rotated on its own axis.

Fig. 18 is a similar view, showing an arrangement wherein the guide rod may not be rotated on its own axis while remaining attached to the bracket.

As shown in the accompanying drawings, the fender guide of the present invention has a rod or staff 15 intended to be located perpendicularly to the ground. At the upper end, it is provided with a sight 16 having a front portion 17 and a rear portion 18.

To clamp the staff 15 to the lower outside edge 19 of a fender 20 shown in Fig. 4, there is provided a bracket 21 having a horizontal portion 22 and a vertical portion 23 intended to lie flatwise against the lower outer edge 19 of the fender. The bracket 21 is secured to the fender's edge by a clamping plate 24 having a ledge 25 at its outer end to engage a bead 26 on the lower edge of the fender and at its rear end a depending arm 27, the lower edge of which engages an incline 28 on the horizontal portion 22 of the bracket. A screw 29 passes upwardly through the portion 22 of the bracket and the clamping plate 24 and above the latter has a nut 30. When the screw is tightened, the ledge 25 is pulled down against the upper inner edge of the bead while the horizontal portion 22 of the clamp is pulled up against the lower portion of the bead. At the same time, the arm 27 moves down the incline 28 and is thus forced forwardly against the inner face of the fender, drawing the vertical portion 23 of the bracket tightly against the outer face of the fender.

The horizontal portion 22 of the bracket has a two-point engagement with the bead 26 and thus assumes a position on a cord of the arc of the fender while the clamping plate 24 has a one-point engagement on the upper edge of the bead and is substantially tangential to the adjacent curved edge of the bead.

When the staff 15 is rigidly attached to the bracket, as was heretofore customary, the staff would lie perpendicular to this cord, and, unless the cord was horizontal, the staff would not be perpendicular to the ground.

Likewise, unless the outer lower edge of the fender was substantially vertical, as shown in Fig. 2, the staff 15 would slant inwardly or outwardly of the fender.

In any of these situations, the true position of the fender would not be indicated to the driver, for it is difficult, and impossible for some persons, to follow an inclined rod or staff and judge the position of its base. Further, as pointed out above, certain dangers and other difficulties are attendant upon an improperly mounted staff or rod 15.

To obviate these difficulties, the present invention provides a substantially universal connection between the staff and the bracket.

In the form of the invention shown in Figs. 1-4, and 9-12, the bracket 21 has located, closely adjacent the horizontal portion 22, a semispherical socket 31, and the lower end of the guide rod 15 is provided with a ball 32 fitting the socket. The ball 32 may be held in the socket 31 in any suitable manner within the broader aspects of this invention. However, in the form of the invention shown in Figs. 1-4 and 9-12, the lower end of the ball is provided with a stud 33 passing through an enlarged and preferably circular hole 34 in the socket 31. The outside surface 35 of the socket 31 is preferably convex and semispherical, for the socket and bracket are preferably made by stamping and forming.

Engaging the outer convex surface 35 of the socket and slidably fitting over the stud 33 is a concave washer 36 and below this there is a friction or split washer 37 and a nut 38 threaded on the stud. When the nut 38 is loosened, the rod 15 may be swung forwardly or backwardly of the vehicle and inwardly and outwardly thereof about the center of the ball 32 to make the rod stand vertically, or, more properly, perpendicular to the ground level, regardless of the position of the bracket relative to the ground level.

For instance, when the lower end of the fender curves downwardly and outwardly as shown in Fig. 9, the bracket inclines upwardly and outwardly, and it is necessary to swing the guide rod 15 counterclockwise as viewed in Fig. 9 to make it stand vertically, and the ball and socket connections 31 and 32 provide for such movement—the hole 34 being large enough to permit sufficient freedom of movement of the stud 33.

In the case of a fender such as shown in Fig. 10, in which the lower edge is curved inwardly and downwardly, the bracket would be tilted downwardly and outwardly, and the guide 15 would have to be swung clockwise, as viewed, to make it vertical.

When the bracket is secured to the downwardly curving portion 39 of the fender 20, as shown in Fig. 11, the bracket inclines downwardly and forwardly, and the rod 15 is swung backwardly and upwardly to make it vertical or perpendicular to the ground. When the bracket is secured to the upwardly and forwardly curving portion 40 of the fender, the rod 15 is swung upwardly and forwardly to make it perpendicular.

Thus it will be seen that with the ball and socket connection between the guide rod and the bracket, it is a simple matter to maintain the rod 15 perpendicular, regardless of the contour or inclination of the lower edge of the fender.

It should also be noted that the conditions illustrated in Fig. 9 may be present along with the conditions illustrated in Figs. 11 and 12, and, likewise, that the conditions illustrated in Fig. 10 may be presented along with the conditions illustrated in Figs. 11 and 12, for, if the fender is of the kind shown in Fig. 9, the fender guide may still be applied to either the ascending or descending portions of the longitudinally curved lower edge of the fender.

The nut 38 may be so applied to the stud 33 that the guide 15 is held merely against casual movement and is capable of being pushed away upon meeting an obstruction. However, according to the present invention, the guide 15 may be locked to the bracket in adjusted position. For this purpose, the concave portion of the socket 31 may have knurling 41 as shown in Fig. 4, and, likewise, the surface of the ball 32 may have knurling 42 as shown in Fig. 2. However, the knurling on the ball 32 and concave surface of the socket 31 may be omitted, and, instead, as illustrated in Figs. 13 and 14, knurling may be provided on the convex lower surface 35 of the bracket and the upper concave surface of the washer 36, if desired.

Some fender guides have distinctly characteristic front and back portions such as the front and back portions 17 and 18 of the sight 16 shown in Fig. 1. When the fender guide is to be applied to the right hand fender, the front portion 17 should be located on the right, as shown in Fig. 1. However, when the fender guide is to be used on the left hand fender, the condition should be reversed, and the front portion 17 should face the left.

Heretofore, to meet this situation, an adjustable connection was provided between the sight 16 and the rod or staff 15. However, according to the present invention, by making the stud 33 cylindrical and the aperture 34 circular, the rod 15 may be rotated about its own axis as well as being rotated about the center of the ball 32.

Should it be desired to provide for only the adjustments shown in Fig. 9, the aperture in the socket 33 would be narrower, elongated and extending transversely of the fender's edge, as is the case with the aperture 34a in the socket 31a shown in Fig. 15. Again, if it is desired merely to accommodate for the adjustments shown in Figs. 11 and 12, the socket 31b illustrated in Fig. 16 and having an elongated narrow aperture 34b may be employed.

If desired, the slots 34a and 34b may be combined as shown in Fig. 17 to form a cross-like slot 34d.

If it is desired to prevent rotation of the rod 15, on its own axis while the rod and bracket are assembled, the arrangement shown in Fig. 18 may be employed, wherein the aperture 34c is elongated like the apertures 34a and 34b, and wherein the portion 33a of the stud extending through the aperture 34 is rectangular and prevents rotation of the rod 15 about the latter's axis.

As shown in Figs. 5-8, the ball and socket connection may be of quite a different type and may be located substantially above the lower edge 19 of the fender. In this case, the bracket 21a has a high vertical portion 23a having at its upper end a concave spherical bearing 43 receiving a ball 44 on the lower edge of a hollow vertical rod 45. The bearing 43 has external threads 46 receiving a cap 47 having a spherical bearing 48 engaging the other side of the ball to clamp it in adjusted position.

With this form of the invention, electric wires employed to illuminate the sight 16 of the fender guide may be conveniently passed up through the upper end of the portion 33a and into the hollow rod 45, whereas, with the form of the invention illustrated in Figs. 1-4 and 9-12, electric wires may be passed into the rod 15 through an aperture 49 in the side of the rod above the ball 32.

The contacting surfaces of the ball 44, bearing 43 and cap bearing 48 may have knurling 50, as indicated in Fig. 7.

It should be distinctly understood that the rod and bracket shown in Figs. 5-8 may be adjusted to meet the conditions and situations referred to above in connection with the form of the invention disclosed in Figs. 1-4, and 9-12.

Other variations and modifications may be made within the scope of this invention and portions of the improvements may be used without others.

Having thus described the invention, what is claimed as new and for which it is desired to obtain Letters Patent, is:—

1. A fender attachment comprising a vertical rod; a bracket having a substantially flat portion adapted to lie flat against the outer surface of the lower edge of a motor vehicle fender; a clamping plate adapted to engage the inner upper edge of a bead at the lower edge of the fender; means for securing said clamp in clamping position and drawing said flat surface of the bracket against the fender; and a pivotal connection between the bracket and said rod about which the rod may be moved forwardly or backwardly of the vehicle or inwardly and outwardly of the fender's edge to make the rod perpendicular to the ground level after the bracket is clamped to the fender.

2. A fender guide comprising a vertical rod; a bracket having a clamp by means of which it is attached to the edge of a motor vehicle fender; a semispherical socket on said bracket; a ball on said rod fitting said socket and adjustable therein to vary the position of the rod; a stud on said ball extending through a substantially larger aperture in said socket and screw-threaded at its outer end; and screw-threaded means engaging said threaded stud and the socket for securing the ball in the socket in adjusted position, said stud being coaxial with the rod so that in adjusted position the rod may be rotated to bring a certain portion thereof to the front.

3. The invention as defined in claim 1, in which the pivotal connection comprises a ball and socket joint universally adjustable to make the rod perpendicular to the ground level.

JOSEPH H. COHEN.